Dec. 3, 1968  J. H. MILLER  3,414,304
APPARATUS FOR FASTENING A DISCONTINUOUS BODY TO ANOTHER
STRUCTURE AND THE RESULTING JOINT
Filed Nov. 22, 1966

INVENTOR.
JOSEPH H. MILLER
BY
ATTORNEYS.

United States Patent Office 3,414,304
Patented Dec. 3, 1968

3,414,304
APPARATUS FOR FASTENING A DISCONTINUOUS BODY TO ANOTHER STRUCTURE AND THE RESULTING JOINT
Joseph H. Miller, Torrance, Calif., assignor to Hi-Shear Corporation, Torrance, Calif., a corporation of California
Filed Nov. 22, 1966, Ser. No. 596,335
1 Claim. (Cl. 287—189.36)

ABSTRACT OF THE DISCLOSURE

This invention relates to a fastening device for fastening a discontinuous body to another structure, and also relates to the joint comprising the discontinuous body and the other structure. A sleeve member is provided having an axial bore and a threaded portion therein; and a bolt member is provided to mate with the threaded portion in the bore of the sleeve member. One member is passed through an outer wall of the discontinuous body remote from the wall of a contiguous structure and the other member is passed through the wall of the structure. Upon engagement of the threaded portions and relative rotation of the members, the relative axial movement between the two members causes a portion of the sleeve member to expand thereby limiting the approach of the head of the bolt member toward the head of the sleeve member and thereby clamping the full section of the discontinuous body to the contiguous structure and preventing deformation of the discontinuous body. According to a preferred form of the invention, the wall of the discontinuous body remote from the wall of the contiguous structure is clamped between the expanded portion of the sleeve and the head of the bolt.

---

This invention relates to a fastening device for fastening a discontinuous body to another structure, and also relates to the joint comprising the said discontinuous body and the other structure. Examples of discontinuous bodies include tubes and honeycombs in which a relatively strong exterior wall encloses a relatively lighter-density region, such as a void passage, foam, extrusions, expanded metal or cardboard, or the like.

The attachment of discontinuous bodies to rigid structures such as frames and the like involves the risk of crushing the discontinuous body by exerting excessive clamping forces. An object of the present invention is to provide a readily assembled, relatively inexpensive and easily produced fastening device for attaching a discontinuous body, such as thin wall tubing or a honeycomb body, to another structure wtihout deforming the discontinuous body.

The present invention comprises a two-piece fastening device consisting of a bolt member and a sleeve member which sleeve member includes an expandible portion. The discontinuous body and the other structure are contiguously joined to form an assembly. The sleeve and the bolt are telescopically joined in the assembly from opposite sides. The sleeve carries a bore having threads engageable with threads on the bolt. One member carries a tapered expander surface having a portion larger than the sleeve bore. When the bolt and sleeve members are assembled by turning one or both members relative to each other, an axial movement results between the sleeve and bolt, causing the tapered expander surface on the one member to engage the other member and to expand a portion of the sleeve. The discontinuous body is attached to the rigid structure between the bolt head and sleeve head. The expanded portion of the sleeve limits the approach of the heads, thereby preventing the heads from crimping or collapsing the discontinuous body.

According to a preferred but optional feature of this invention, a wall of the discontinuous body remote from the wall of the contiguous structure is clamped between the bolt head and the expanded portion of the sleeve.

The above and other features of this invention will be fully understood from the following detailed description and the accompanying drawings, in which.

Figure 1:
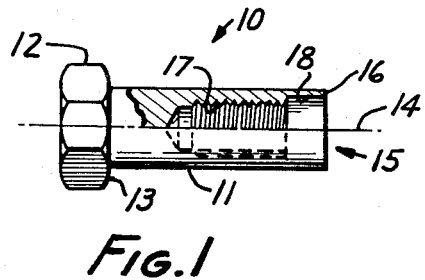
FIG. 1 is an illustration, partly in cross-section, of a sleeve member useful in a fastening device according to the invention.
Figure 2:
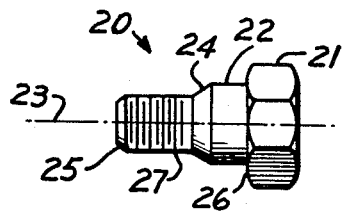
FIG. 2 is an illustration of a bolt member for use with the sleeve member illustrated in FIG. 1.

In the drawings, a fastening device is illustrated including sleeve member 10 and bolt member 20. A cylindrical sleeve portion 11 and a head 12 are formed on sleeve member 10. Head 12 although illustrated as a hexagonal head for engagement by a wrench, may instead be any suitable head for engagement by any suitbale driver. For example, head 12 may, instead of being hexagonal, include a slot for engagement by a screw driver. Head 12 carries annular face 13 between the head and the cylindrical sleeve portion. The head and cylindrical sleeve portion are preferably formed about a common axis 14.

A cylindrical bore 15 is formed in cylindrical sleeve portion 11 and is preferably centered on axis 14. Passage 15 carries suitable internal threads 17 for engagement with the bolt of the fastening device. A cylindrical wall 18 is preferably counterbored into bore 15 for a short distance from face 16. Wall 18 thus forms a cylindrical surface to bear against an expander surface on the bolt of the fastening device in a manner to be explained hereinafter.

A bolt 20 forming the other member of a fastener has a head 21 and a cylindrical shank 22. Head 21 and cylindrical shank 22 are preferably formed about a common axis 23. Although illustrated as a hexagonal head, head 21 may be modified as was discussed in connection with head 12. An annular face 26 is formed on the bolt member between the head and the cylindrical shank. The diameter of shank 22 is preferably larger than the diameter of cylindrical wall 18 of sleeve 10 and preferably approximates the outer diameter of cylindrical sleeve portion 11. A tapered surface 24 (sometimes called an "expander surface") is located between threaded portion 27 and cylindrical shank 22. Surface 24 may be frusto-conical and centered on axis 23. It will be noted that the shank of the sleeve member is solid except at its internal thread and at the counterbore (the small cylindrical region just to the left of the threads in FIG. 1 merely being the end of a drilled passage such as is customarily drilled before tapping in the threads). This makes for a stronger sleeve member which is less liable to collapse from end forces, and which provides a solid, continuous cross-section in shear at the juncture of the two bodies. It will be noted that all junctures of the bodies and the fastener are made by strong, integral, continuous cross-sections of the fastener.

Bolt 20 carries an external threaded portion 27 for engagement with internal threaded portion 17 of sleeve 10. The forward end 25 may be chamfered as shown.

An expander surface may be provided on sleeve member 10 instead of, or in addition to expander surface 24 on bolt member 20. One example of an expander surface on sleeve member 10 is a tapered internal surface between cylindrical wall 18 of the counterbore and face 16 of the sleeve member. With such an arrangement, the shank of the bolt (or the expander surface on the bolt, if one is provided) engages the tapered surface at the opening into the counterbore, forcing expansion of that portion of the sleeve in the manner described.

Figure 3:
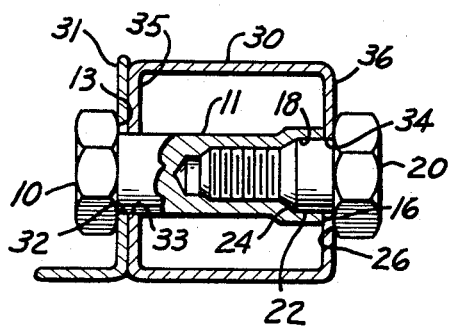
FIG. 3 is an illustration, partly in cross-section, of an assembled fastener of FIGS. 1 and 2 and of a joint comprising a discontinuous body assembled to another structure, showing the preferred embodiment of both the fastener and of the assembled joint.

FIG. 3 illustrates a discontinuous body 30, in this case a hollow, square-section tube, fastened to a substantially rigid structure 31, such as a frame. Discontinuous body 30 may also be fastened to other discontinuous bodies, instead of to a rigid structure with the present fastening device, because this device is self-limiting as to compression. Discontinuous body 30 may be constructed of any suitable material, such as metal, fiberboard or plastic and may be tubular with any cross-section. Discontinuous body 30 is a body having a discontinuous cross-section which might be crushed when subjected to clamping forces. The body may be hollow, as in a pipe, or may be honeycombed, with a bounding skin.

A hole 32 is formed in the wall of structure 31, while holes 33 and 34 are formed in walls 35 and 36, respectively, of discontinuous body 30. Holes 32, 33 and 34 are of such size so that cylindrical portion 11 of the sleeve may be positioned in holes 32 and 33 and shank 22 of the bolt may be positioned in hole 34. When the bolt and sleeve are assembled, face 26 of the bolt abuts wall 36 of discontinuous body 30 and face 13 of the sleeve abuts the wall of structure 31. The axes of sleeve 10 and bolt 20 are concentric when threaded together.

As the threaded portions 17 and 27 of the sleeve and bolt, respectively, are engaged and relatively rotated, the axial pull caused by the action of the threads forces the members telescopically toward each other, and movement of face 18 of the sleeve along the expander surface 24 causes a flaring of a portion of the sleeve over the frustoconical surface 24 and cylindrical shank 22 of the bolt. The expansion over the shank continues until face 16 of the sleeve is brought into abutment against the inside of wall 36. Thus, discontinuous body 30 is attached to structure 31 between the heads of sleeve 10 and bolt 20, and wall 36 is clamped in position between face 16 of the sleeve and annular face 26 of the bolt, thereby preventing deformation of discontinuous body 30. The expanded portion of the sleeve limits further inward movement of the bolt head, thereby preventing the heads from crimping or collapsing the discontinuous body. Should the expanded portion of the sleeve pierce the skin or wall 36 of the discontinuous body, the head of bolt 20 will abut the end of the sleeve, limiting further inward movement of the bolt head, thereby preventing the heads from crushing the discontinuous body.

The full section of the discontinuous body is clamped to the wall of contiguous structure 31 between the heads of members 10 and 20. The expanded portion of the sleeve limits the approach of the heads, thereby preventing the heads from crimping or collapsing the discontinuous body.

Although FIG. 3 illustrates the sleeve installed in the hole in structure 31 and the bolt installed in the hole in wall 36 of discontinuous body 30, and the expanded portion of the sleeve against wall 36 of the discontinuous body. The sleeve assembly may be reversed so that the expanded portion of the sleeve is against wall 35 of the body. In such an arrangement, sleeve 10 is inserted through hole 34 of discontinuous body 30 and bolt 20 is inserted through holes 32 and 33 of the contiguous structure and the discontinuous body. Such an arrangement preferably clamps wall 35 of discontinuous body 30 to structure 31 between the expanded portion of the sleeve and the bolt head. Even should the expanded portion of the sleeve pierce wall 35 of the discontinuous body, still the full section of the body remains clamped to the contiguous structure between the heads of members 10 and 20.

The present invention thus provides a simple, inexpensive, readily manufactured fastening device for attaching a discontinuous body, such as a tube or a honeycomb structure, to another structure which is usually but need not always be rigid, without crushing the discontinuous body.

This invention is not to be limited by the embodiment shown in the drawings and described in the description which is given by way of example and not of limitation, but only in accordance with the scope of the appended claims.

What is claimed is:

1. A joint comprising in combination: a structure having a wall and a hole therethrough; a discontinuous body contiguous to the wall of said structure and having an outer wall with a portion remote from the wall of said structure, said portion of the outer wall and also the contiguous portion having a respective hole therethrough; all of said holes being axially aligned; and a fastening device comprising a bolt member having an axis, a solid shank, a head integral with said shank, an external threaded portion on the shank formed about said axis, and a tapered expander section between the thread and the head; and a sleeve member having an axis, a head, a sleeve integral with said head, an axial counterbore in said sleeve forming an opening in said sleeve remote from said head of smaller inner diameter than the largest diameter of the expander section, and an internal threaded portion opening onto said counterbore, the sleeve being solid except at the thread and counterbore, the threaded portions of said members being mutually telescopically engaged inside said discontinuous body; the counterbore portion being expanded onto said tapered expander section; one of said members being passed into the hole in the outer wall of said discontinuous body and into said discontinuous body, and the other of said members being passed into the hole in the wall of said structure; said solid portions of said bolt and sleeve generally filling said holes whereby the discontinuous body is attached to said structure, and the expanded portion of said sleeve limits by abutment the approach of the head on said bolt member toward the head on said sleeve member so as to prevent deformation of the discontinuous body.

References Cited

UNITED STATES PATENTS

| | | | |
|---|---|---|---|
| 2,060,070 | 11/1936 | Belden | 85—77 |
| 3,078,002 | 2/1963 | Rodgers | 85—73 |

FOREIGN PATENTS

| | | |
|---|---|---|
| 418,914 | 11/1934 | Great Britain. |
| 525,695 | 9/1940 | Great Britain. |

EDWARD C. ALLEN, *Primary Examiner.*